United States Patent
Gao et al.

(10) Patent No.: US 8,706,769 B1
(45) Date of Patent: Apr. 22, 2014

(54) PROCESSING INSERT WITH NORMALIZE STATEMENTS

(75) Inventors: Like Gao, San Diego, CA (US);
Bhashyam Ramesh, Secunderabad (IN);
John A. Greene, San Diego, CA (US);
Michael Leon Reed, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 680 days.

(21) Appl. No.: 12/650,706

(22) Filed: Dec. 31, 2009

(51) Int. Cl.
*G06F 7/00* (2006.01)

(52) U.S. Cl.
USPC ........................................... 707/796

(58) Field of Classification Search
USPC .......... 707/796, 705, 741, 802, 999.01, 999.1
See application file for complete search history.

(56) References Cited

U.S. PATENT DOCUMENTS

| | | | | |
|---|---|---|---|---|
| 6,233,573 B1 * | 5/2001 | Bair et al. | | 1/1 |
| 6,711,560 B2 * | 3/2004 | Levy et al. | | 1/1 |
| 7,991,794 B2 * | 8/2011 | Bedi et al. | | 707/796 |
| 2005/0071346 A1 * | 3/2005 | Bernal et al. | | 707/100 |
| 2008/0120309 A1 * | 5/2008 | Copeland | | 707/100 |
| 2009/0157623 A1 * | 6/2009 | Bedi et al. | | 707/3 |

* cited by examiner

*Primary Examiner* — Hung T Vy
(74) *Attorney, Agent, or Firm* — Howard Speight; Randy L. Campbell, Jr.

(57) ABSTRACT

A temporal target table stored on a computer is scanned using the computer. The temporal target table has a ValidTime dimension and a value dimension. A qualifying-row having a value dimension having a value equal to a value of a value dimension in a row-to-be-inserted is found during the scanning. The row-to-be-inserted has a ValidTime dimension and the value dimension. The qualifying-row is processed. The row-to-be-inserted is inserted in the temporal target table. A ValidTime dimension of the inserted row-to-be-inserted is set to be as the union of the ValidTime dimension of the row-to-be-inserted and the ValidTime dimension of the qualifying-row.

16 Claims, 5 Drawing Sheets

PROCESSING INSERT WITH NORMALIZE STATEMENTS

BACKGROUND

A temporal table inherently stores time dimension data without the use of user-defined date or timestamp columns. One such time dimension is ValidTime, which records the period of time over which a given temporal table row is valid. A given temporal data row may include a ValidTime dimension and a non-temporal value dimension. Two rows in a temporal table with the same value in the non-temporal value dimension may be "normalized," which means to update the ValidTime of one of the rows as the union of its ValidTime with the ValidTime of the other row, and then to delete the other row.

SUMMARY

In general, in one aspect, the invention featured a method. The method includes scanning, using a computer, a temporal target table stored on the computer. The temporal target table has a ValidTime dimension and a value dimension. The method further includes finding, during the scanning, a qualifying-row having a value dimension having a value equal to a value of a value dimension in a row-to-be-inserted. The row-to-be-inserted has a ValidTime dimension and the value dimension. The method further includes processing the qualifying-row. The method further includes inserting the row-to-be-inserted in the temporal target table. The method further includes setting the ValidTime dimension of the inserted row-to-be-inserted as the union of the ValidTime dimension of the row-to-be-inserted and the ValidTime dimension of the qualifying-row.

Implementations of the invention may include one or more of the following. The method may include reading a plurality of rows from a source, each row in the plurality of rows having a ValidTime dimension and a non-temporal value dimension, each row in the plurality of rows having the same value in the non-temporal value dimension. The method may include creating the row-to-be-inserted by inserting the value of the non-temporal value dimension in the plurality of rows into the non-temporal value dimension of the row-to-be-inserted and inserting a union of the ValidTime dimensions of the plurality of rows into the ValidTime dimension of the row-to-be-inserted. The source file may be sorted by the non-temporal value dimension. The method may include a) reading a first plurality of rows from a source, each row in the first plurality of rows having a ValidTime dimension and a non-temporal value dimension, each row in the first plurality of rows having the same value in the non-temporal value dimension. The method may include b) creating a first-intermediate-record-to-be-inserted by b1) inserting the value of the non-temporal value dimension in the first plurality of rows stored in the middle buffer into the non-temporal value dimension of the first-intermediate-record-to-be-inserted, b2) inserting a union of the ValidTime dimensions of the first plurality of rows into the ValidTime dimension of the first-intermediate-record-to-be-inserted, and b3) storing the first-intermediate-record-to-be-inserted in a middle buffer. The method may include c) reading a second plurality of rows from the target table. Each row in the second plurality of rows may have a ValidTime dimension and a non-temporal value dimension. Each row in the second plurality of rows may have the same value in the non-temporal value dimension that is the same as non-temporal value of the first-intermediate-record-to-be-inserted. The method may include d) creating a second-intermediate-record-to-be-inserted by d1) inserting the value of the non-temporal value dimension in the first-intermediate-record-to-be-inserted stored in the middle buffer into the non-temporal value dimension of the second-intermediate-record-to-be-inserted, d2) inserting a union of the ValidTime dimensions of the second plurality of rows and the first-intermediate-record-to-be-inserted into the ValidTime dimension of the second-intermediate-record-to-be-inserted, and d3) storing the second-intermediate-record-to-be-inserted in the insert buffer. The method may include e) setting the row-to-be-inserted to be the second-intermediate-record-to-be-inserted. The method may include reading a plurality of rows from a source, each row in the plurality of rows having a ValidTime dimension and a non-temporal value dimension. The method may include creating the row-to-be-inserted by setting the value of the non-temporal value dimension to the value of the non-temporal value dimension of a subset of the plurality of rows having the same value in their respective non-temporal value dimensions and setting the value of the ValidTime dimension to the union of the values of the ValidTime dimensions of the subset of the plurality of rows. The method may include a) reading a first plurality of rows from a source, each row in the plurality of rows having a ValidTime dimension and a non-temporal value dimension. The method may include b) creating a plurality of first-intermediate-record-to-be-inserted, by b1) grouping the first plurality of rows by the non-temporal value, and b2) for each group, inserting the value of the non-temporal value dimension of the row in the group into the non-temporal value dimension of the first-intermediate-record-to-be-inserted; b2) for each group, inserting a union of the ValidTime dimensions of the row in the group into the ValidTime dimension of the first-intermediate-record-to-be-inserted; and b3) storing the first-intermediate-record-to-be-inserted in a middle buffer. The method may include c) continuing a) and b) until the middle buffer is full. The method may include d) for each first-intermediate-record-to-be-inserted, creating a second-intermediate-record-to-be-inserted by d1) reading a second plurality of rows from the target table to find the rows that has the same non-temporal value as that of the first-intermediate-record-to-be-inserted, d2) inserting the value of the non-temporal value dimension of the first-intermediate-row-to-be-inserted into the non-temporal value dimension of the second-intermediate-record-to-be-inserted, and d3) inserting a union of the ValidTime dimensions of the second plurality of rows and the first-intermediate-record-to-be-inserted into the ValidTime dimension of the second-intermediate-record-to-be-inserted. The method may include e) for each second-intermediate-record-to-be-inserted, creating a third-intermediate-record-to-be-inserted by e1) scanning the insert buffer to find the record that has the same non-temporal value as that of the second-intermediate-record-to-be-inserted, e2) if such record does not exist, storing the second-intermediate-record-to-be-inserted as the third-intermediate-record-to-be-inserted in the insert buffer, and e3) if such record exists, e3.1) inserting the value of the non-temporal value dimension of the second-intermediate-row-to-be-inserted into the non-temporal value dimension of the third-intermediate-record-to-be-inserted, e3.2) inserting a union of the ValidTime dimensions of this record and the second-intermediate-record-to-be-inserted into the ValidTime dimension of the third-intermediate-record-to-be-inserted, and e3.3) replacing this record in the insert buffer with the third-intermediate-record-to-be-inserted. The method may include g) setting the row-to-be-inserted to be the third-intermediate-record-to-be-inserted. Processing the qualifying row may include determining that the temporal table is a bi-temporal table and closing the qualifying row. Inserting the row-to-be-inserted in the temporal target table may include inserting the row-to-be-inserted in the temporal target table directly. Inserting the row-to-be-inserted in the temporal target table may include inserting the row-to-be-inserted in a spool file and later expanding and flushing this spool file to the target table when all the row-to-be-inserted are processed. Processing the qualifying row may include determining that the temporal table is a ValidTime table and deleting the qualifying row. Deleting the qualifying row and inserting the row-to-be-inserted in the temporal target table may be combined into one update replacing the qualifying row with the row-to-be-inserted. The method may be extended to a method for an UPDATE WITH NORMALIZE statement. The extended method may include a) building and putting all the updated rows in a spool. The extended method may include b) sorting the spool by non-temporal value dimension. The extended method may include c) deleting all the rows in the target table that was updated in (a). The extended method may include d) applying the method of claim 1 with the unsorted spool in (a) or the sorted spool in (b). The method may be extended to a method for an ALTER TABLE NORMALIZE statement. The extended method may include a) selecting all the rows from the target table into a spool. The extended method may include b) sorting the spool by the non-temporal value dimension. The extended method may include c) deleting the target table. The extended method may include d) applying the method of claim 1 with the unsorted spool in (a) or the sorted spool in (b).

In general, in another aspect, the invention features a database system. The database system includes one or more nodes. The database system further includes a plurality of CPUs, each of the one or more nodes providing access to one or more CPUs. The database system further includes a plurality of virtual processes, each of the one or more CPUs providing access to one or more virtual processes. Each virtual process is configured to manage data, including rows from the set of database table rows, stored in one of a plurality of data-storage facilities. The database system further includes a process. The process scans, using a computer, a temporal target table stored on the computer, wherein the temporal target table has a ValidTime dimension and a value dimension. The process further finds, during the scanning, a qualifying-row having a value dimension having a value equal to a value of a value dimension in a row-to-be-inserted. The row-to-be-inserted has a ValidTime dimension and the value dimension. The process processes the qualifying-row. The process inserts the row-to-be-inserted in the temporal target table. The process sets the ValidTime dimension of the inserted row-to-be-inserted as the union of the ValidTime dimension of the row-to-be-inserted and the ValidTime dimension of the qualifying-row.

In general, in another aspect, the invention features a computer program, stored in a computer-readable tangible medium. The program includes executable instructions that cause a computer to scan, using a computer, a temporal target table stored on the computer. The temporal target table has a ValidTime dimension and a value dimension. The program further includes executable instructions that cause the computer to find, during the scanning, a qualifying-row having a value dimension having a value equal to a value of a value dimension in a row-to-be-inserted. The row-to-be-inserted has a ValidTime dimension and the value dimension. The program further includes executable instructions that cause the computer to process the qualifying-row. The program further includes executable instructions that cause the computer to insert the row-to-be-inserted in the temporal target table. The program further includes executable instructions that cause the computer to set the ValidTime dimension of the inserted row-to-be-inserted as the union of the ValidTime dimension of the row-to-be-inserted and the ValidTime dimension of the qualifying-row.

DETAILED DESCRIPTION

Figure 1:
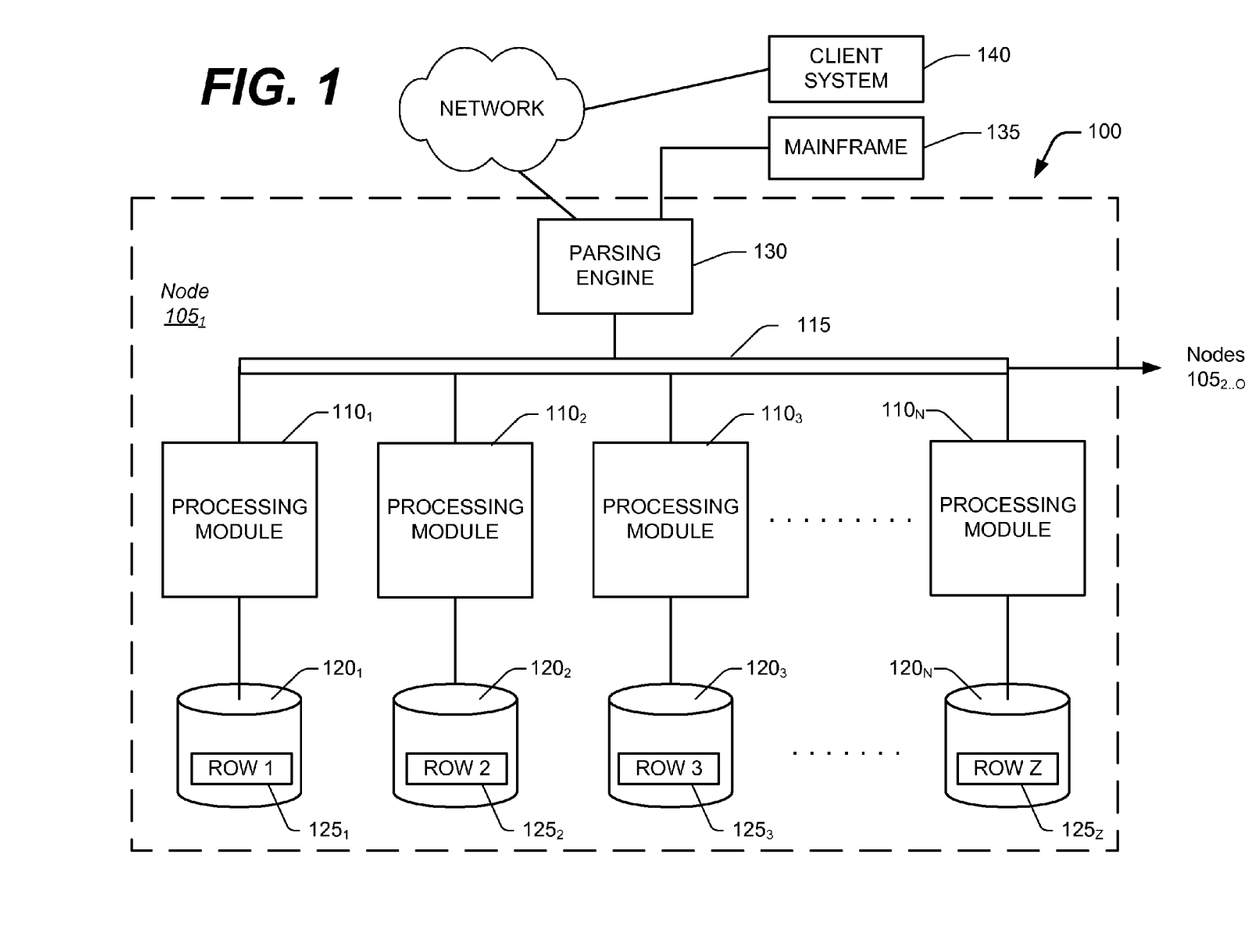
FIG. 1 is a block diagram of a node of a database system.
Figure 2:
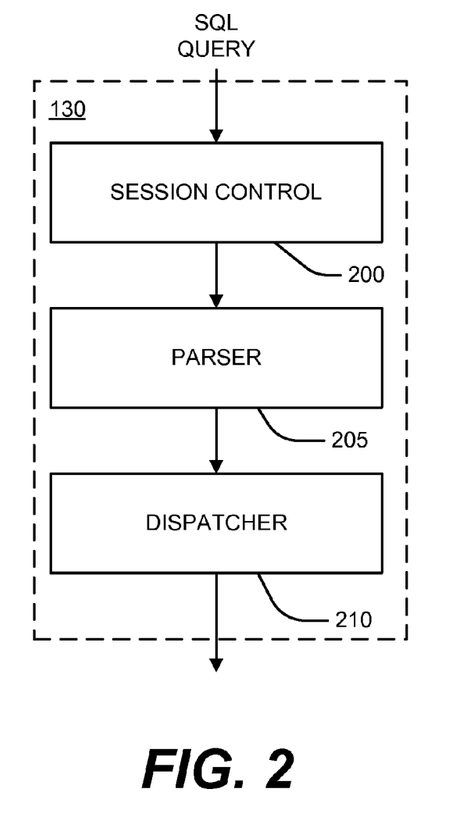
FIG. 2 is a block diagram of a parsing engine.
Figure 3:
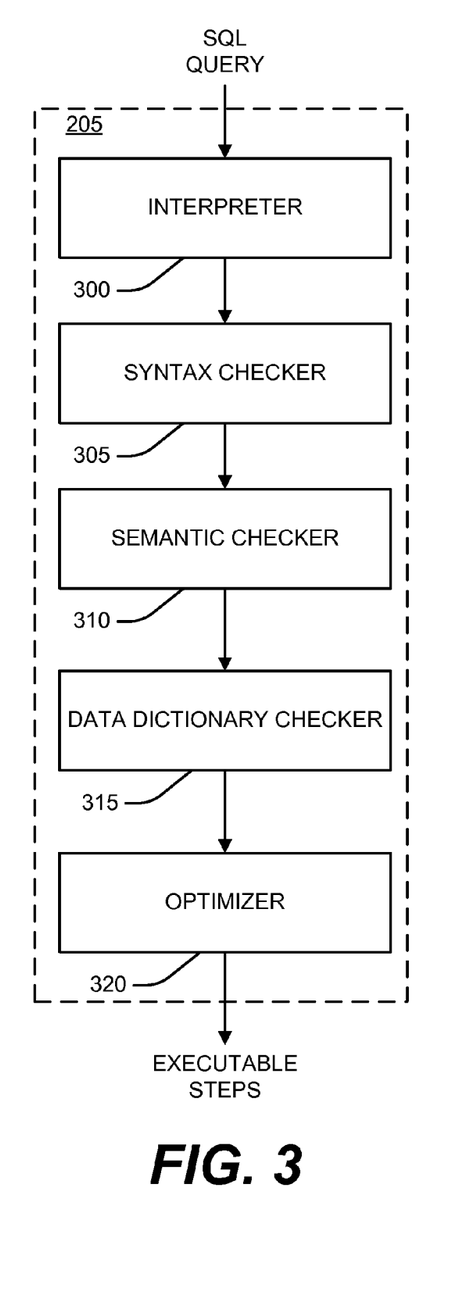
FIG. 3 is a flow chart of a parser.

The data representation and processing technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Temporal Databases

A temporal database management system is defined to be a database management system with built-in support for reasoning with time such as a temporal data model, temporal constraints, and a temporal version of SQL.

A temporal database is defined to be a database capable of inherently storing data (i.e., without the use of user-defined date or timestamp columns, or the like) that relates to time instances. Such a database provides temporal data types and stores information related to the past, present, and future. For example, such a temporal database might store an inventory history or the movement of employees within an organization. While a conventional database can maintain temporal data, it is typically done using user-defined date or timestamp columns, or the like, which are maintained in a temporal manner.

In one embodiment, there are three different fundamental kinds of time in a temporal database. The first type is user-defined times that are un-interpreted time values. Such times typically are defined as DateTime data types or Period data types.

In one embodiment, DateTime data types are conventional types. In one embodiment, Period data types define a time period and include a beginning element that defines the beginning of the time period and an ending element that defines the end of the time period.

In one embodiment, the second fundamental kind of time in a temporal database is ValidTime, which is typically defined as a Period data type with an element type of DATE or TIMESTAMP, and which is defined to denote the time period during which a fact (typically represented as a row in a table) is true (or valid) with respect to the real world.

In one embodiment, the third fundamental kind of time in a temporal database is TransactionTime, which is typically defined as a Period data type with an element type of TIMESTAMP, and which is defined to denote the time period beginning when a fact was first known (or recorded) in the database and ending when superseded by an update to the fact or when the fact is deleted.

In one embodiment, the ValidTime and TransactionTime period values do not have to be the same for a row. In one embodiment, the three kinds of time are orthogonal. That is, a table can have one, two, or all three kinds of time, each providing a different dimension for reasoning on time.

A ValidTime table is defined to be a table that has ValidTime but not TransactionTime.

A TransactionTime table is defined to be a table that has TransactionTime but not ValidTime.

A bi-temporal table is defined to be a table that has both ValidTime and TransactionTime.

A temporal table is defined to be a table that has ValidTime and/or TransactionTime.

A non-temporal table is defined to be a table that has neither ValidTime nor TransactionTime.

In one embodiment, as is conventional, there are four forms or variants of temporal statements: current, sequenced, non-sequenced, and AS OF. A temporal statement of the current form is defined to be a statement that works with the current snapshot of data. A temporal statement of the sequenced form is defined to be a statement that considers the table as a sequence of snapshot states and works with each state of the data independently. A sequenced form can optionally specify the period of interest for the sequenced operation. This period of interest is called the period of applicability. A temporal statement of the non-sequenced type ignores the time dimensions for data and works across all the snapshot states simultaneously. An AS OF statement uses a snapshot of data as of the date or timestamp identified in the AS OF clause.

In one embodiment, a row in a ValidTime table can be a current row, a future row, or a history row. A current row is defined to be a row in which its ValidTime period overlaps current time. A future row is defined to be a row in which the begin time of its ValidTime period is in the future with respect to current time. A history row is defined to be a row in which the end time of its ValidTime is in the past with respect to current time. A valid row is defined to be a current row or a future row. A no-longer-valid row is defined to be a history row. A special case of ValidTime period being NULL is defined in which a row does not qualify as a current row, future row, or history row.

A row in a table with TransactionTime (i.e., a TransactionTime table or a bi-temporal table) can be an open row or a closed row. An open row is defined to be a row in which the TransactionTime end time is UNTIL_CLOSED. A closed row is a row in which the TransactionTime end time is not UNTIL_CLOSED (i.e., the row is closed in Transaction-Time). In one embodiment, the UNTIL_CLOSED literal has a value associated with a time far in the future, such as the year 9999.

In a TransactionTime table, an open row is also called a current row and a closed row is also called a history row. In one embodiment, there is not concept of a future row in the TransactionTime dimension because the system maintains the TransactionTime column such that a TransactionTime begin time is never in the future and a TransactionTime end time is either UNTIL_CLOSED or in the past.

In one embodiment, a row in a bi-temporal table can be a current row, a future row, or a history row. A current row is defined to be an open row in which the ValidTime period overlaps current time. A future row is an open row in which the ValidTime begin time is in the future with respect to current time. A valid row is a row in which the ValidTime period overlaps current time or in which the ValidTime begin time is in the future with respect to current time. All rows that are either not open in TransactionTime or not valid in Valid-Time are called history rows. An open but no-longer-valid row, a valid but closed row, and a neither valid nor open row are all history rows. In one embodiment, a row is not considered a current, future, or history row if the ValidTime period is null.

In one embodiment, all rows in a ValidTime table are considered to be open rows in the TransactionTime dimension and, therefore, the definition of a current, future, or history row is the same as for a bi-temporal table. Further, in one embodiment all rows in a TransactionTime table are considered to overlap current time in the ValidTime dimension and, therefore, the definition of a current or history row is the same as for a bi-temporal table. In addition, the definition of a valid or no-longer-valid row is the same for all three kinds of temporal tables.

A DML statement is defined to be a statement such as INSERT, UPDATE, or DELETE statements that adds, modifies, or deletes table rows, and does not include the SQL SELECT statement.

A current query (i.e., a SQL SELECT statement) or a current DML statement operates on the current rows of a table. A current constraint operates on current and future rows of a table.

A single modification DML statement, such as an UPDATE, INSERT, or DELETE, issued on a temporal table may map to one or more than one SQL operation on the table. For example, while an insert on a temporal table leads to one insert, an update on a bi-temporal table may lead to one update and multiple inserts. The actual number of operations depends on the temporal content of the row. Therefore this mapping is one-to-many. The mapping is not constant. It depends on the validity of the row and the number of time dimensions—ValidTime, TransactionTime or both.

For example, a user issued CURRENT VALIDTIME DELETE on a ValidTime table maps to an update on current rows. The ValidTime portion starting from current time is deleted. If the ValidTime starts at current time then the row is deleted. A user issued SEQUENCED VALIDTIME DELETE on a ValidTime table without a period of applicability deletes the row. With a period of applicability this operation deletes the period of applicability portion from the ValidTime of the row and therefore can result in some combination of an update and delete. Consider the ValidTime table named Employee_Salary shown in Table 1 (note that the dates are shown in mm-dd-yyyy format and, for simplicity of presentation, do not include time information; it will be understood that other formats are possible and that more precise time information can be included):

TABLE 1

| Employee_ID | Salary | Job_Duration (ValidTime) |
| --- | --- | --- |
| 1001 | 50000 | Jan. 1, 2007, Jan. 1, 2008 |
| 1001 | 55000 | Jan. 1, 2008, Jan. 1, 2009 |
| 1001 | 57000 | Jan. 1, 2009, UNTIL_CHANGED |

Assuming that the current date is sometime during 2008, Table 1 indicates that employee 1001's salary was $50,000 during 2007, is $55,000 during 2008, and is scheduled to increase to $57,000 during 2009. The first row is a history row, the second row is a current row, and the third row is a future row. Assume the following DML statement is executed on Jul. 1, 2008:

SEQUENCED VALIDTIME PERIOD(CURRENT_DATE, UNTIL_CHANGED)
DELETE FROM Employee_Salary WHERE Employee_ID=1001;

To execute this statement in one embodiment, no change is required to the first row, the second row is updated to show the deletion date, and the third row is deleted producing the result in Table 2:

TABLE 2

| Employee_ID | Salary | Job_Duration (ValidTime) |
| --- | --- | --- |
| 1001 | 50000 | Jan. 1, 2007, Jan. 1, 2008 |
| 1001 | 55000 | Jan. 1, 2008, Jul. 1, 2008 |

A user issued CURRENT VALIDTIME UPDATE on a ValidTime table maps to an update and insert on current rows. A user issued SEQUENCED VALIDTIME <period of applicability> UPDATE on a ValidTime table maps to an update, on the rows whose ValidTime overlaps with the specified PA, for the overlapped portion and inserts for the non-overlapping portions of the ValidTime value. Considering again the ValidTime table in Table 1 above, assume the following DML statement is executed on Jul. 1, 2008. Assume that we wish to increase the salary from Oct. 1, 2008, to $60,000.

SEQUENCED VALIDTIME PERIOD(DATE '2008-10-01', UNTIL_CHANGED)
UPDATE Employee Salary
SET Salary='60000'
WHERE Employee_ID='1001'
;

To execute this statement in one embodiment, no change is required to the first row, an update and an insert is required on the second row and an update is required on the third row, producing the result in Table 3:

TABLE 3

| Employee_ID | Salary | Job_Duration (ValidTime) |
| --- | --- | --- |
| 1001 | 50000 | Jan. 1, 2007, Jan. 1, 2008 |
| 1001 | 55000 | Jan. 1, 2008, Oct. 1, 2008 |
| 1001 | 60000 | Oct. 1, 2008, Jan. 1, 2009 |
| 1001 | 60000 | Jan. 1, 2009, UNTIL_CHANGED |

A user issued CURRENT VALIDTIME UPDATE on a bi-temporal table maps to an update and up to two inserts on current rows. A user issued SEQUENCED VALIDTIME <period of applicability> UPDATE on a bi-temporal table maps to an update, on open rows whose ValidTime overlaps with the specified PA, to close the open row and inserts multiple rows for the overlapped and non-overlapping ValidTime portions. Consider the bi-temporal table named Employee_Salary_Bi_Temporal shown in Table 4:

TABLE 4

| Employee_ID | Salary | Job_Duration (ValidTime) | TransactionTime |
| --- | --- | --- | --- |
| 1001 | 50000 | Jan. 1, 2007, UNTIL_CHANGED | Jan. 1, 2007, UNTIL_CLOSED |

Assume the following DML statement is executed on Sep. 15, 2007:

SEQUENCED VALIDTIME PERIOD(01-01-2008,UNTIL_CHANGED)
UPDATE Employee_Salary_Bi_Temporal
SET Salary='55000'
WHERE Employee_ID='1001';

To execute this statement in one embodiment, the single row is updated and two new rows are inserted:

TABLE 5

| Employee_ID | Salary | Job Duration (ValidTime) | TransactionTime |
| --- | --- | --- | --- |
| 1001 | 50000 | Jan. 1, 2007, UNTIL_CHANGED | Jan. 1, 2007, Sep. 15, 2007 |
| 1001 | 50000 | Jan. 1, 2007, Jan. 1, 2008 | Sep. 15, 2007, UNTIL_CLOSED |
| 1001 | 55000 | Jan. 1, 2008, UNTIL_CHANGED | Sep. 15, 2007, UNTIL_CLOSED |

In Table 5, the first row is now a history row (i.e., because it is a closed row in the TransactionTime dimension), the second row is a current row until Jan. 1, 2008 when it becomes a history row, and the third row is a future row until Jan. 1, 2008 when it becomes a current row.

Now assume the following DML statement is executed on Oct. 1, 2008:
SEQUENCED VALIDTIME
  PERIOD (Date '2009-01-01', UNTIL_CHANGED)
UPDATE Employee_Salary_Bi_Temporal
SET Salary='57000'
WHERE Employee_ID='1001';

On Oct. 1, 2008 at the time of execution of the DML statement, the first two rows of the Employee_Salary_Bi_Temporal table, whose current status is shown in Table 5, are history rows and the third row is the qualified row whose ValidTime overlaps with the specified period-of-applicability and is an open row. To execute this DML statement in one embodiment, the first two rows are not changed, the third row is updated and two new rows are inserted:

TABLE 6

| Employee_ID | Salary | Job_Duration (ValidTime) | TransactionTime |
|---|---|---|---|
| 1001 | 50000 | Jan. 1, 2007, UNTIL_CHANGED | Jan. 1, 2007, Sep. 15, 2007 |
| 1001 | 50000 | Jan. 1, 2007, Jan. 1, 2008 | Sep. 15, 2007, UNTIL_CLOSED |
| 1001 | 55000 | Jan. 1, 2008, UNTIL_CHANGED | Sep. 15, 2007, Oct. 1, 2008 |
| 1001 | 55000 | Jan. 1, 2008, Jan. 1, 2009 | Oct. 1, 2008, UNTIL_CLOSED |
| 1001 | 57000 | Jan. 1, 2009, UNTIL_CHANGED | Oct. 1, 2008, UNTIL_CLOSED |

In Table 6, the first three rows are history rows (the first and third rows because they are closed in the TransactionTime dimension, and the second row because the Job_Duration period does not overlap the current time), the fourth row is a current row until Jan. 1, 2009 when it becomes a history row, and the fifth row is a future row until Jan. 1, 2009 when it becomes a current row.

Now assume the following DML statement is executed on Oct. 10, 2008:
SEQUENCED VALIDTIME
  PERIOD (Date '2009-01-01', UNTIL_CHANGED)
UPDATE Employee_Salary_Bi_Temporal
SET Salary='60000'
WHERE Employee_ID='1001';

To execute this DML statement in one embodiment, the first four rows are not changed, the fifth row is updated and a new row is inserted:

TABLE 7

| Employee_ID | Salary | Job_Duration (ValidTime) | TransactionTime |
|---|---|---|---|
| 1001 | 50000 | Jan. 1, 2007, UNTIL_CHANGED | Jan. 1, 2007, Sep. 15, 2007 |
| 1001 | 50000 | Jan. 1, 2007, Jan. 1, 2008 | Jan. 1, 2007, UNTIL_CLOSED |
| 1001 | 55000 | Jan. 1, 2008, UNTIL_CHANGED | Sep. 15, 2007, Oct. 1, 2008 |
| 1001 | 55000 | Jan. 1, 2008, Jan. 1, 2009 | Oct. 1, 2008, UNTIL_CLOSED |
| 1001 | 57000 | Jan. 1, 2009, UNTIL_CHANGED | Oct. 1, 2008, Oct. 10, 2008 |
| 1001 | 60000 | Jan. 1, 2009, UNTIL_CHANGED | Oct. 10, 2008, UNTIL_CLOSED |

INSERT WITH NORMALIZE

One embodiment of an INSERT WITH NORMALIZE DML statement allows users to normalize qualifying rows in a ValidTime table or a bi-temporal table in the process inserting rows to the table. A qualifying row is defined as a row in the table that is value equivalent to the row-to-be-inserted in the non-temporal value dimension, while its ValidTime meets or overlaps with that of the row-to-be-inserted. In the context of the INSERT WITH NORMALIZE statement, "normalization" means to update the row-to-be-inserted's ValidTime as the union of its original ValidTime with the qualifying row's ValidTime. Furthermore, normalization either deletes the qualifying row, if the table is a ValidTime table, or closes it out, if the table is a bi-temporal table. INSERT WITH NORMALIZE doesn't apply to a TransactionTime table as no ValidTime is defined in such a table.

Figure 4A:
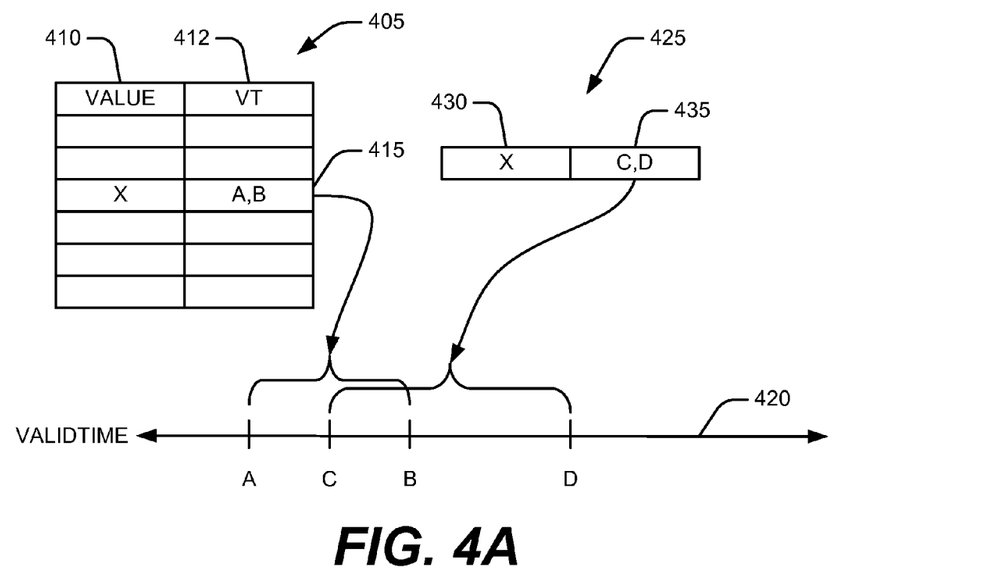
FIGS. 4A and 4B, 5, and 6 illustrate embodiments of INSERT WITH NORMALIZE processing.
Figure 4B:
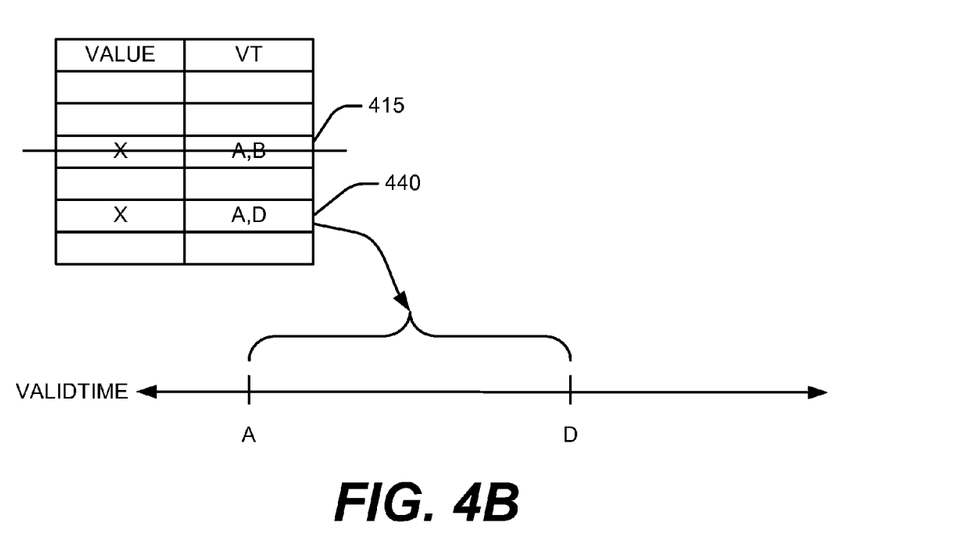

The general concept of the INSERT WITH NORMALIZE statement is illustrated in FIGS. 4A and 4B. A temporal table 405 includes a non-temporal value dimension 410 (i.e., a dimension that is not necessarily a time dimension; it will be understood that the value dimension may be multiple dimensions) and a ValidTime dimension 412. One row 415 in temporal table 405 has a value of "X" and the ValidTime dimension covers the time range from "A" to "B." The "A" to "B" time range is illustrated on a ValidTime timeline 420. A row-to-be-inserted 425 has the same value "X" in its value dimension 430 but has a different time range from "C" to "D" in its ValidTime dimension 435. The "C" to "D" time range overlaps the "A" to "B" time range, as shown on the ValidTime timeline 420.

In one embodiment, when the row-to-be-inserted 425 is inserted using an INSERT WITH NORMALIZE statement, with the result shown in FIG. 4B, the existing row 415 is merged with the row-to-be-inserted 425 because of the equality of their value dimensions (i.e., both equal "X") to produce row 440. In one embodiment, the ValidTime dimension of the resulting row 440 is set to the union of the ValidTime dimension of the two merged rows (i.e., "A" to "B" unioned with "C" to "D" resulting in "A" to "D"). In one embodiment, the disposition of the original row 415 (i.e., whether it is deleted or closed as indicated by the line through original row 415 in FIG. 4B) depends on the circumstances, as discussed further below.

Unlike the traditional insert statement which doesn't affect existing rows in the table, INSERT WITH NORMALIZE will incur an additional overhead to normalize with the qualifying rows. This overhead increases when the insert is a multi-row insert, or an insert-select statement.

In one embodiment, there are three scenarios for INSERT WITH NORMALIZE:
  A. single row insert
  B. insert-select (or multi-row insert) where all the rows-to-be-inserted are in a spool file that is sorted by all of the non-temporal column values.
  C. insert-select (or multi-row insert) where all the rows-to-be-inserted are in a spool file that is NOT sorted.

In one embodiment, three techniques are provided to handle the three scenarios. Later it will be shown that these three techniques can be generalized as one.

For scenario A), the normalization technique (called one-step normalization) is, in one embodiment:
  A1) Scan a target table to find a next row qualifying for normalization (i.e., it is value-equivalent with a row-to-be-inserted);
  A2) Normalize the qualifying row: if the target table is a ValidTime table, delete it; if the target table is a bi-temporal table, close it out;
  A3) Set the ValidTime of the row-to-be-inserted as the union of its original ValidTime and the ValidTime of the qualifying row;

A4) Repeat A1-A3 until there are no more rows to be processed;

A5) Insert the row-to-be-inserted to the target table.

The above technique is called one-step normalization as, in one embodiment, the normalization only happens against the target table. For improved performance, A5 above can be enhanced as an in-place update while skipping one of delete in A2 if the table is ValidTime table.

Figure 5:
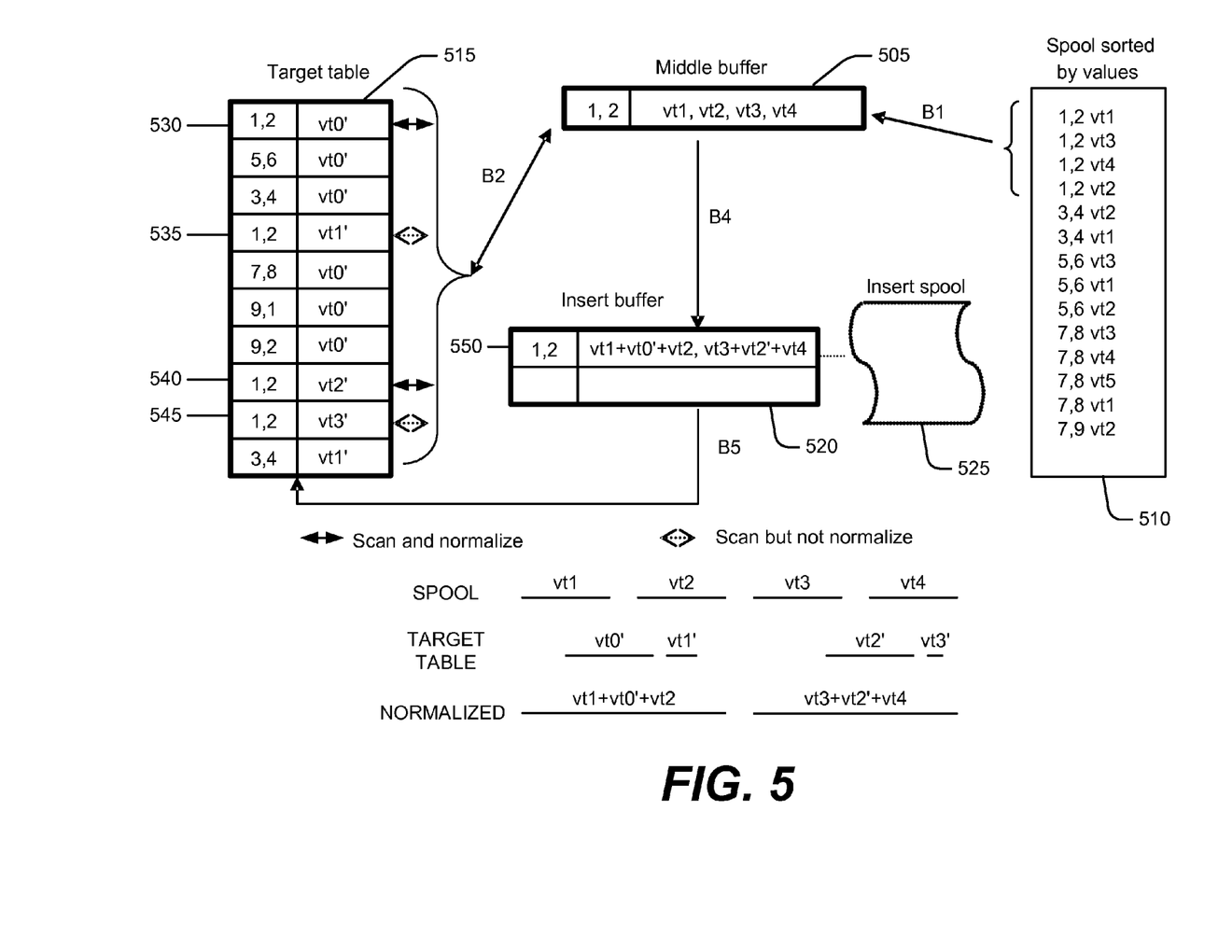

For scenario B), the technique (called two-step normalization) is, in one embodiment, illustrated in FIG. 5:

B1) Read a next batch of value equivalent rows into a middle buffer 505 from a spool file 510 that contains all rows-to-be-inserted. Combine them into one record with a sequence of ValidTimes (e.g., the record shown in the middle buffer 505 in FIG. 5 having value dimensions with values "1,2" and ValidTime having values vt1, vt2, vt3, and vt4). These ValidTimes are normalized amongst themselves and then sorted by the begin value of Valid-Time (called ValidTime.Begin).

B2) Using the record in the middle buffer 505 scan the target table 515 for normalization. In FIG. 5, the target table 515 includes 4 rows 530, 535, 540. 545 having value dimensions with values "1,2." The 4 rows have respective ValidTime values of vt0' (530), vt1' (535), vt2' (540), and vt3' (545).

B3) If a row in the target table 515 is normalized, either delete it (if the target table 515 is a ValidTime table), or close it out (if the target table 515 is a bi-temporal table). Union the row's ValidTime to the ValidTimes in the middle buffer 505. Note that when a ValidTime in the target table 515 is UNIONed with a ValidTime in the middle buffer 520 the new ValidTime value may meet or overlap with some other ValidTime values in the spool 510 that did not previously meet or overlap. The result is normalized record 550. Normalized record 550 has "1,2" in its value dimension and the union of vt1, vt0', and vt2 and the union of vt3, vt2', and vt4 in its Valid-Time dimension. vt1' and vt3' are not included because they are entirely covered by the other two ranges, as indicated by the ValidTime representations at the bottom of FIG. 5.

B4) Cache the normalized record to be inserted 550 in an insert buffer 520.

B5) If the insert buffer 520 is full or the spool file 510 is empty, expand each record in the buffer back to rows and flush them into the target table 515.

B6) Go to B1 until there is no row to be consumed in the spool file 510.

In scenario B), in one embodiment, as the spool file 510 is already sorted by value, B1 will read in a batch of all value equivalent rows. During the reading, in one embodiment, these rows are first normalized by UNIONing their Valid-Times, and, in one embodiment, are combined into one record to save buffer space. In one embodiment, B2 applies this record to normalize the rows in the target table.

Since normalization happens in two places, in one embodiment this technique is called two-step normalization. Note that, in one embodiment, the rows cached in buffer 505 will not be used by the subsequent normalization of the next batch of rows. For improved performance, in one embodiment, B5 can be enhanced to add an insert spool 525 to cache the records when the insert buffer 520 is full, so B5 will not flush buffer 520 to the target table 515. In one embodiment, this spool 525 will be expanded and flushed to the table after B6, when all the rows in the spool file 510 have been processed.

Figure 6:
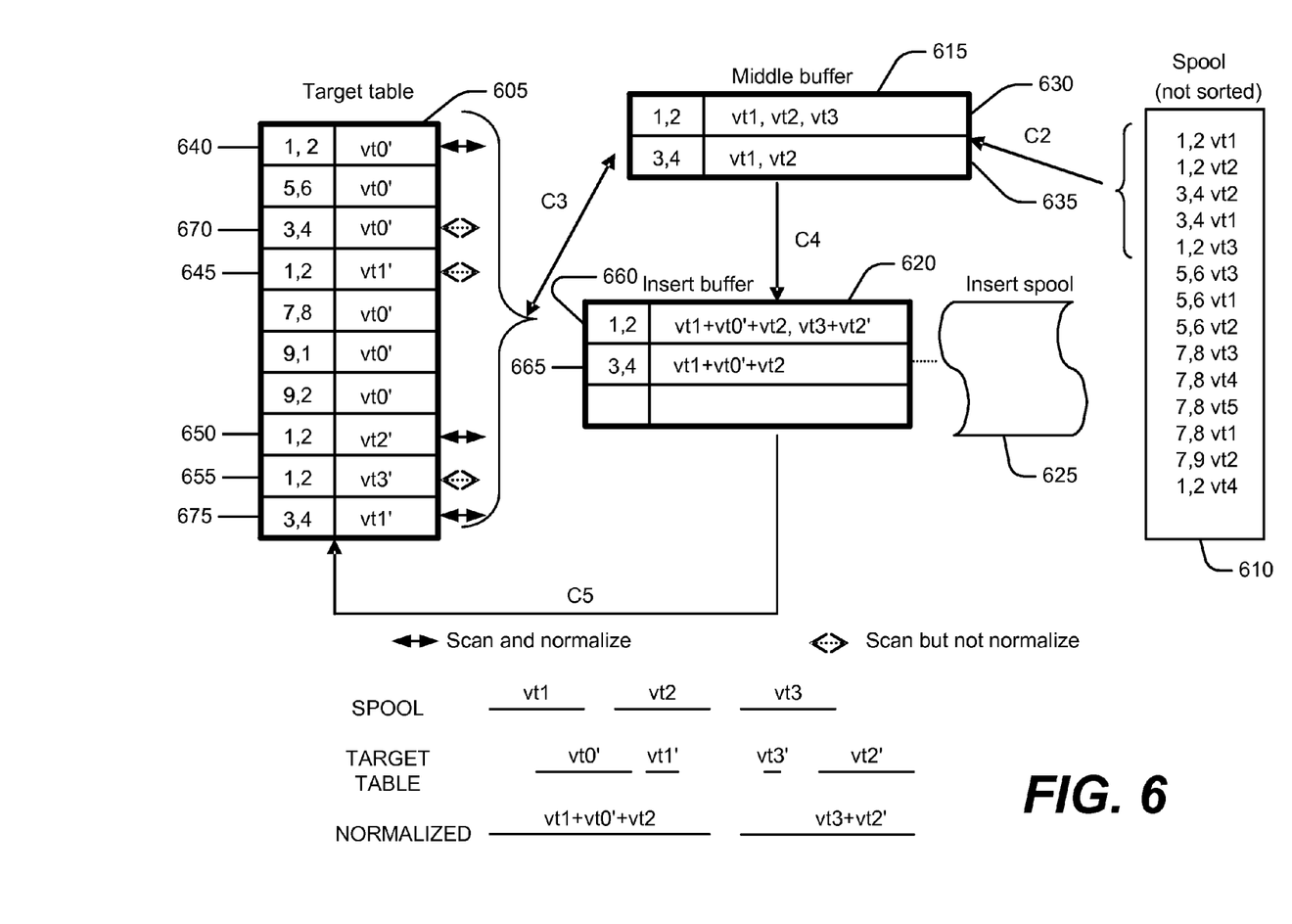

For scenario C), the technique (called three-step normalization) is, in one embodiment:

C1) If the target table 605 is a bi-temporal table, get current transaction timestamp as TransStart. This timestamp will not be changed during the whole insert-select.

C2) Read in as many rows as possible from the spool file 610, combine them into records and cache the records in a middle buffer 615 until the buffer is full. Each record in the middle buffer 615 represents a batch of value equivalent rows. The middle buffer 615 in FIG. 6 includes one record 630 having "1,2" in its value dimension and vt1, vt2, vt3 in its ValidTime dimension and a second record 635 having "3,4" in its value dimension and vt1, vt2 in its ValidTime dimension. During the reading, all the Valid-Times for one record are normalized and then sorted by ValidTime.Begin.

C3) Using each record in the middle buffer 615 scan the whole table for normalization: If a row in the table is normalized, either physically delete it (if ValidTime table, or if bi-temporal table and the row has its begin value of the TransactionTime, called TransactionTime.Begin, not less than TransStart), or close it out (if bi-temporal table and the row's transaction time is less than TransStart). Then, UNION this row's ValidTime to the ValidTimes in the middle buffer. In FIG. 6, the scan of the target table 605 for rows with value dimensions matching the values ("1,2") of the first record 630 in the middle buffer 615 will locate rows 640, 645, 650, and 655 with ValidTimes of vt0', vt1', vt2', and vt3', respectively. Those rows are normalized to produce record 660, which has a ValidTime of vt1+vt0'+vt2 and vt3+vt2'. vt1' (associated with row 645) and vt3' (associated with row 655) are not included because they are entirely covered by the other ranges, as indicated by the ValidTime ranges at the bottom of FIG. 6. Similarly, the scan of the target table 605 for rows with value dimensions matching the value of the second record 635 in the middle buffer 615 will locate rows 670 and 675 with ValidTimes of vt0' and vt1', respectively. Those rows are normalized to produce record 665, which has a ValidTime of vt1+vt0'+vt2. vt1' (associated with row 675) is not included because it is entirely covered by the other ranges.

C4) Using each record generated in C3 to normalize existing records in the insert buffer 620 and inserting the resulting records into the insert buffer 620. In FIG. 6, since the initial insert buffer has no existing rows, so append the records 660, 665 to the insert buffer 620. During this normalization, the existing records in the inserting buffer 620 being normalized will be deleted for both ValidTime table and bi-temporal table cases, since these are intermediate records.

C5) If the insert buffer 620 is full or the spool file 610 is empty, expand records in the buffer to rows and flush them into the target table 605.

C6) Go to C1 until there is no row to be consumed in the spool file 610.

In scenario C), in one embodiment, the spool 610 is not sorted by value, so C2 will read in many rows until the middle buffer 615 is full. During the reading, in one embodiment, these rows are normalized by UNIONing their ValidTimes, and then are combined into several records to save buffer space. In one embodiment, C3 then applies these records to normalize the rows in the target table 605. Once this step is done, in one embodiment, C4 will apply these records to normalize the insert buffer 620 (note this normalization is not needed for scenario B). Since normalization happens in three places, this technique is called three-step normalization. For improved performance, in one embodiment, C5 above can be enhanced to add an insert spool 625 to cache the records when the insert buffer 620 is full, so C4 will not flush buffer 620 to the target table 605. In one embodiment, the insert spool 625 is an extension of the insert buffer 620, and will be normalized and merge-sorted each time when appending the insert buffer 620. In one embodiment, the insert spool 625 will be expanded and flushed to the target table after C6, when all the rows in the spool file 620 have been processed.

Note that in one embodiment of scenario C), the bi-temporal table case, C2 uses TransStart to decide whether to delete or close out a row in the target table 605 that is just normalized. In one embodiment, this row can be either an original row (which exists before the insert-select), or a row just been normalized and added by this insert-select. If this row has its TransactionTime.Begin less than TransStart, then, in one embodiment, it must be an original row so it will be closed-out. Otherwise, in one embodiment, it was normalized by this insert-select (in C2, C3 or C4) and was flushed to the target table 605 (in C5) some time earlier, so it will be deleted. In comparison, in one embodiment of scenario B), in the bi-temporal table case, all the target rows normalized (in B2) and then flushed (in B4) won't be qualified again by the subsequent normalization processing. So, in one embodiment, there is no need to check TransactionTime.Begin against TransStart because all the rows processed in B2 are original rows.

Though the three techniques are proposed for the three scenarios, in one embodiment the first two can be viewed as the special cases of three-step normalization. That is, in one embodiment, by caching only one record in the middle buffer 615, ignoring TransStart, and bypassing the normalization against the insert buffer 620, three-step normalization degrades to two-step normalization. Furthermore, in one embodiment, by ignoring the middle buffer 505 and insert buffer 520 (and also the enhanced insert spool 525), it further degrades to one-step normalization. This generalization eases the implementation of the technique to handle all the three scenarios.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   reading a plurality of rows from a source, each row in the plurality of rows having a ValidTime dimension and a non-temporal value dimension, each row in the plurality of rows having the same value in the non-temporal value dimension;
   creating an intermediate-record-to-be-inserted by:
   inserting the value of the non-temporal value dimension in the plurality of rows into the non-temporal value dimension of the intermediate-record-to-be-inserted; and
   inserting a union of the ValidTime dimensions of the plurality of rows from the source into the ValidTime dimension of the intermediate-record-to-be-inserted;
   scanning, using a computer, a temporal target table stored on the computer, wherein the temporal target table has a ValidTime dimension and a value dimension;
   finding, during the scanning, a qualifying row having a value dimension having a value equal to a value of the value dimension in the intermediate-row-to-be-inserted;
   processing the qualifying row;
   creating a row-to-be-inserted by:
   inserting the value of the value dimension of the intermediate-row-to-be-inserted into a value dimension of the row-to-be-inserted; and
   inserting the union of the ValidTime dimension of the qualifying row and the ValidTime dimension of the intermediate-row-to-be-inserted into a ValidTime dimension of the row-to-be-inserted; and
   inserting the row-to-be-inserted in the temporal target table.

2. The method of claim 1, wherein the source file is sorted by the non-temporal value dimension.

3. The method of claim 1 further comprising:
   a) storing the first-intermediate-record-to-be-inserted in a middle buffer;
   b) reading a second plurality of rows from the target table, each row in the second plurality of rows having a ValidTime dimension and a non-temporal value dimension, each row in the second plurality of rows having the same value in the non-temporal value dimension that is the same as non-temporal value of the first intermediate-record-to-be-inserted;
   c) creating a second-intermediate-record-to-be-inserted by:
      c1) inserting the value of the non-temporal value dimension in the first intermediate-record-to-be-inserted stored in the middle buffer into the non-temporal value dimension of the second-intermediate-record-to-be inserted;
      c2) inserting a union of the ValidTime dimensions of the second plurality of rows and the first-intermediate-record-to-be-inserted into the ValidTime dimension of the second-intermediate-record-to-be-inserted; and
      c3) storing the second-intermediate-record-to-be-inserted in the insert buffer; and
   d) setting the row-to-be-inserted to be the second-intermediate-record-to-be-inserted.

4. The method of claim 1 further comprising:
   a) creating a plurality of first-intermediate-record-to-be-inserted, by:
      a1) grouping the first plurality of rows by the non-temporal value, and
      a2) for each group, inserting the value of the non-temporal value dimension of the row in the group into the non-temporal value dimension of a respective first-intermediate-record-to-be-inserted;
      a3) for each group, inserting a union of the ValidTime dimensions of the row in the group into the ValidTime dimension of the respective first-intermediate-record-to-be-inserted; and
      a4) storing the respective first-intermediate-record-to-be-inserted in a middle buffer;
   b) continuing the reading of the first plurality of rows and the creating the plurality of the first-intermediate-record-to-be-inserted until the middle buffer is full;
   c) for each first-intermediate-record-to-be-inserted, creating a second-intermediate record-to-be-inserted by:
      c1) reading a second plurality of rows from the target table to find the rows that have the same non-temporal value as that of the first-intermediate-record to-be-inserted;
      c2) inserting the value of the non-temporal value dimension of the first-intermediate-row-to-be-inserted into the non-temporal value dimension of the second-intermediate-record-to-be-inserted; and
      c3) inserting a union of the ValidTime dimensions of the second plurality of rows and the first-intermediaterecord-to-be-inserted into the ValidTime dimension of the second-intermediate-record-to-be-inserted;
d) for each second-intermediate-record-to-be-inserted, creating a third-intermediate-record-to-be-inserted by:
   d1) scanning the insert buffer to find the record that has the same non-temporal value as that of the second-intermediate-record-to-be-inserted;
   d2) if such record does not exist, storing the second-intermediate-record-to-be inserted as the third-intermediate-record-to-be-inserted in the insert buffer; and
   d3) if such record exists,
      d3.1) inserting the value of the non-temporal value dimension of the second-intermediate-row-to-be-inserted into the non-temporal value dimension of the third-intermediate-record-to-be-inserted;
      d3.2) inserting a union of the ValidTime dimensions of this record and the second-intermediate-record-to-be-inserted into the ValidTime dimension of the third-intermediate-record-to-be-inserted; and
      d3.3) replacing this record in the insert buffer with the third-intermediate record-to-be-inserted; and
e) setting the row-to-be-inserted to be the third-intermediate-record-to-be-inserted.

5. The method of claim 1 wherein processing the qualifying row comprises:
   determining that the temporal table is a bi-temporal table; and
   closing the qualifying row.

6. The method of claim 1 wherein inserting the row-to-be-inserted in the temporal target table comprises an insertion technique selected from the group of insertion techniques consisting of:
   inserting the row-to-be-inserted in the temporal target table directly; and
   inserting the row-to-be-inserted in a spool file and later expanding and flushing this spool file to the target table when all each row-to-be-inserted is processed.

7. The method of claim 1 wherein processing the qualifying row comprises:
   determining that the temporal table is a ValidTime table; and
   deleting the qualifying row.

8. The method of claim 7 wherein deleting the qualifying row and inserting the row-to be-inserted in the temporal target table are combined into one update replacing the qualifying row with the row-to-be-inserted.

9. The method of claim 1 extended to a method for an UPDATE WITH NORMALIZE statement comprising:
   a) building and putting all updated rows in a spool;
   b) sorting the spool by non-temporal value dimension;
   c) deleting all the rows in the target table that was updated in (a); and
   d) applying the method of claim 1 with the unsorted spool in (a) or the sorted spool in (b).

10. The method of claim 1 extended to a method for an ALTER TABLE NORMALIZE statement comprising:
    a) selecting all the rows from the target table into a spool;
    b) sorting the spool by the non-temporal value dimension;
    c) deleting the target table; and
    d) applying the method of claim 1 with the unsorted spool in (a) or the sorted spool in (b).

11. A database system comprising:
    one or more nodes;
    a plurality of central processing units (CPUs), each of the one or more nodes providing access to one or more CPUs;
    a plurality of virtual processors, each of the one or more CPUs providing access to one or more virtual processors, each virtual processor configured to manage data, including rows from the set of database table rows, stored in one of a plurality of data-storage facilities wherein at least one of the virtual processors is configured to:
    read a plurality of rows from a source, each row in the plurality of rows having a temporal dimension and a non-temporal value dimension, each row in the plurality of rows having a same value in the non-temporal value dimension;
    create an intermediate-record-to-be-inserted by:
    insertion of the value of the non-temporal value dimension in the plurality of rows into a non-temporal value dimension of the intermediate-record-to-be-inserted; and
    insertion of a union of the temporal dimensions of the plurality of rows from the source into a temporal dimension of the intermediate-record-to-be-inserted;
    scan, using a computer, a temporal target table stored on the computer, wherein the temporal target table has a temporal dimension and a value dimension;
    find, during the scan, a qualifying row having a value dimension having a value equal to a value of a value dimension in the intermediate-row-to-be-inserted;
    process the qualifying row;
    insert the value of the value dimension of the intermediate-row-to-be-inserted into a value dimension of a row-to-be-inserted;
    insert the union of the temporal dimension of the qualifying row and the temporal dimension of the intermediate-row-to-be-inserted into a temporal dimension of the row-to-be-inserted; and
    insert the row-to-be-inserted in the temporal target table.

12. The database system of claim 11, wherein the at least one of the virtual processors is further configured to:
    a) store the first-intermediate-record-to-be-inserted in a middle buffer;
    b) read a second plurality of rows from the target table, each row in the second plurality of rows having a temporal dimension and a non-temporal value dimension, each row in the second plurality of rows having the same value in the non-temporal value dimension that is the same as the non-temporal value of the first-intermediate-record-to-be-inserted;
    c) insert the value of the non-temporal value dimension in the first-intermediate-record-to-be-inserted stored in the middle buffer into a non-temporal value dimension of a second-intermediate-record-to-be-inserted;
    d) insert a union of the temporal dimensions of the second plurality of rows and the first-intermediate-record-to-be-inserted into a temporal dimension of the second-intermediate-record-to-be-inserted; and
    e) store the second-intermediate-record-to-be-inserted in the insert buffer; and
    f) set the row-to-be-inserted to be the second-intermediate-record-to-be-inserted.

13. The database system of claim 11, wherein the at least one of the virtual processors is further configured to:
    a) create a plurality of first-intermediate-record-to-be-inserted, wherein the creation is performed by:
       a1) the plurality of rows being grouped by the non-temporal value, and
       a2) for each group, insertion of the value of the non-temporal value dimension of the row in the group into a non-temporal value dimension of a respective first-intermediate-record-to-be-inserted;

a3) for each group, insertion of a union of the temporal dimensions of rows in the group into a temporal dimension of the respective first-intermediate-record-to-be-inserted; and
a4) storage of the first-intermediate-record-to-be-inserted in a middle buffer;
b) continue the read of the first plurality of rows and the creation of the plurality of first-intermediate-record-to-be-inserted until the middle buffer is full;
c) for each first-intermediate-record-to-be-inserted, create a second-intermediate-record-to-be-inserted, wherein the creation is performed by:
c1) a read of a second plurality of rows from the target table to find the rows that have the same non-temporal value as that of the first-intermediate-record-to-be-inserted;
c2) an insertion of the value of the non-temporal value dimension of the first-intermediate-row-to-be-inserted into a non-temporal value dimension of the second-intermediate-record-to-be-inserted; and
c3) insertion of a union of the temporal dimensions of the second plurality of rows and the first-intermediate-record-to-be-inserted into a temporal dimension of the second-intermediate-record-to-be-inserted;
d) for each second-intermediate-record-to-be-inserted, create a third-intermediate-record-to-be-inserted, where creation is performed by:
d1) a scan of the insert buffer to find the record that has the same non-temporal value as that of the second-intermediate-record-to-be-inserted;
d2) if such record does not exist, a storage of the second-intermediate-record-to-be inserted as the third-intermediate-record-to-be-inserted in the insert buffer; and
d3) if such record exists,
d3.1) an insertion the value of the non-temporal value dimension of the second-intermediate-row-to-be-inserted into a non-temporal value dimension of the third-intermediate-record-to-be-inserted;
d3.2) an insertion of a union of the temporal dimensions of this record and the second-intermediate-record-to-be-inserted into a temporal dimension of the third-intermediate-record-to-be-inserted; and
d3.3) a replacement of this record in the insert buffer with the third-intermediate-record-to-be-inserted; and
e) set the row-to-be-inserted to be the third-intermediate-record-to-be-inserted.

14. A computer program, stored in a non-transitory computer-readable tangible medium, the program comprising executable instructions that cause a computer to:
read a plurality of rows from a source, each row in the plurality of rows having a temporal dimension and a non-temporal value dimension, each row in the plurality of rows having the same value in the non-temporal value dimension;
create an intermediate-record-to-be-inserted by:
insertion of the value of the non-temporal value dimension in the plurality of rows into the non-temporal value dimension of the intermediate-record-to-be-inserted;
insertion of a union of the temporal dimensions of the plurality of rows from the source into a temporal dimension of the intermediate-record-to-be-inserted;
scan a temporal target table stored on the computer, wherein the temporal target table has a temporal dimension and a value dimension;
find, during the scan, a qualifying row having a value dimension having a value equal to a value of a value dimension in a row-to-be-inserted;
process the qualifying row;
create a row-to-be-inserted by:
insertion of the value of the value dimension of the intermediate-row-to-be-inserted into a value dimension of the row-to-be-inserted; and
insertion of the union of the ValidTime dimension of the qualifying row and the ValidTime dimension of the intermediate-row-to-be-inserted into a temporal dimension of the row-to-be-inserted; and
insert the row-to-be-inserted in the temporal target table.

15. The computer program of claim 14 further comprising executable instructions that cause the computer to:
a) store the first-intermediate-record-to-be-inserted in a middle buffer;
b) read a second plurality of rows from the target table, each row in the second plurality of rows having a temporal dimension and a non-temporal value dimension, each row in the second plurality of rows having the same value in the non-temporal value dimension that is the same as non-temporal value of the first-intermediate-record-to-be-inserted;
c) create a second-intermediate-record-to-be-inserted by:
c1) insertion of the value of the non-temporal value dimension in the first-intermediate-record-to-be-inserted stored in the middle buffer into a non-temporal value dimension of the second-intermediate-record-to-be-inserted;
c2) insertion of a union of the temporal dimensions of the second plurality of rows and the first-intermediate-record-to-be-inserted into a temporal dimension of the second-intermediate-record-to-be-inserted; and
c3) storing the second-intermediate-record-to-be-inserted in the insert buffer; and
d) set the row-to-be-inserted to be the second-intermediate-record-to-be-inserted.

16. The computer program of claim 14 further comprising executable instructions that cause the computer to:
a) create a plurality of first-intermediate-record-to-be-inserted, wherein the creation is performed by:
a1) the first plurality of rows being grouped by the non-temporal value, and
a2) for each group, insertion of the value of the non-temporal value dimension of the row in the group into the non-temporal value dimension of the first-intermediate-record-to-be-inserted;
a3) for each group, insertion of a union of the temporal dimensions of the row in the group into a temporal dimension of the first-intermediate-record-to-be-inserted; and
a4) storage of the first-intermediate-record-to-be-inserted in a middle buffer;
b) continue the read of the first plurality of rows and the creation of the plurality of first-intermediate-record-to-be-inserted until the middle buffer is full;
c) for each first-intermediate-record-to-be-inserted, create a second-intermediate-record-to-be-inserted by:
c1) a read of a second plurality of rows from the target table to find the rows that has the same non-temporal value as that of the first-intermediate-record-to-be-inserted;
c2) an insertion of the value of the non-temporal value dimension of the first-intermediate-row-to-be-inserted into a non-temporal value dimension of the second-intermediate-record-to-be-inserted; and c3) an insertion of a union of the temporal dimensions of the second plurality of rows and the first-intermediate-record-to-be-inserted into a temporal dimension of the second-intermediate-record-to-be-inserted;

d) for each second-intermediate-record-to-be-inserted, create a third-intermediate-record-to-be-inserted, wherein creation is performed by:

d1) a scan of the insert buffer to find the record that has the same non-temporal value as that of the second-intermediate-record-to-be-inserted;

d2) if such record does not exist, a storage of the second-intermediate-record-to-be-inserted as the third-intermediate-record-to-be-inserted in the insert buffer; and d3) if such record exists, d3.1) an insertion of the value of the non-temporal value dimension of the second-intermediate-row-to-be-inserted into a non-temporal value dimension of the third-intermediate-record-to-be-inserted;

d3.2) an insertion of a union of the temporal dimensions of this record and the second-intermediate-record-to-be-inserted into a temporal dimension of the third-intermediate-record-to-be-inserted; and d3.3) a replacement of this record in the insert buffer with the third-intermediate-record-to-be-inserted; and e) set the row-to-be-inserted to be the third-intermediate-record-to-be-inserted.

* * * * *